Figure 1:
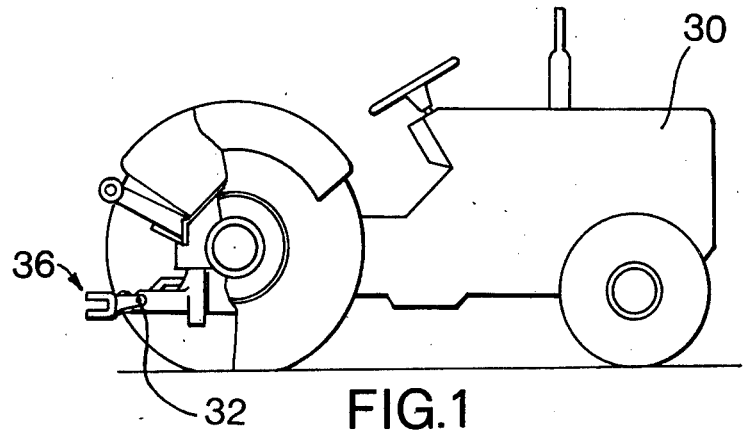

United States Patent [19]

Old

[11] 4,126,328

[45] Nov. 21, 1978

[54] HITCHES

[75] Inventor: John L. Old, Kenilworth, England

[73] Assignee: Massey-Ferguson Services N.V., Curacao, Netherlands Antilles

[21] Appl. No.: 759,508

[22] Filed: Jan. 14, 1977

[30] Foreign Application Priority Data

Dec. 22, 1976 [GB] United Kingdom ............... 53459/76

[51] Int. Cl.² ............................................. B60D 1/06
[52] U.S. Cl. ................................................ 280/415 A
[58] Field of Search ............... 280/415 R, 415 A, 417; 172/248

[56] References Cited

U.S. PATENT DOCUMENTS

| | | | |
|---|---|---|---|
| 3,837,674 | 9/1974 | Rathsack | 280/417 |
| 3,843,160 | 10/1974 | Frushour | 280/415 A |
| 3,848,893 | 11/1974 | Patterson | 280/415 A |

*Primary Examiner*—Joseph F. Peters, Jr.
*Assistant Examiner*—R. Schrecengost
*Attorney, Agent, or Firm*—John C. Thompson

[57] ABSTRACT

An adaptor for converting a drawbar hook into a clevis bears against a portion of the hook to inhibit movement in a vertical direction. A pin is used to connect the adaptor to the drawbar. The adaptor is shaped so that it is reversible to provide different heights for the clevis.

8 Claims, 6 Drawing Figures

HITCHES

This invention relates to hitch assemblies and to an adaptor for use in hitch assemblies. In particular the invention is for an improved hitch assembly whereby towing and towed vehicles may be connected together.

The invention has particular reference to agricultural tractors which are fitted with attachment hooks and which sometimes require to be attached to towed vehicles fitted with draw tongues intended for attachment to a clevis. For this purpose the invention provides means whereby the hook on the tractor can be connected to the towed vehicle using a simple adaptor.

According to a first aspect of the invention a hitch assembly for connecting together towing and towed vehicles comprises an adaptor having a clevis at one end for attachment to one vehicle having a draw tongue, an opening towards the other end, the opening being arranged to receive a hook mounted on another vehicle, and attachment means for attaching the end of the adaptor remote from the clevis releasably to the root of the hook, the opening having side walls profiled to inhibit movement of the hook about the attachment means and the adaptor lying in a generally horizontal plane between the draw tongue and the hook when in use.

Preferably the attachment means comprises a pin engageable through generally horizontal apertures in the adaptor and the root of the hook.

Conveniently said walls of the opening have mutually inclined portions located adjacent similarly disposed surfaces of the hook to inhibit movement of the adaptor about the hook in a vertical plane.

According to a second aspect of the invention an adaptor for use in the assembly comprises a clevis at one end and an opening towards the other end, the adaptor having portions defining side walls of the opening which are profiled to inhibit movement of the adaptor in a vertical direction when a hook is engaged in said opening, and the adaptor having means remote from the clevis whereby the adaptor can be attached to said hook.

Figure 2:
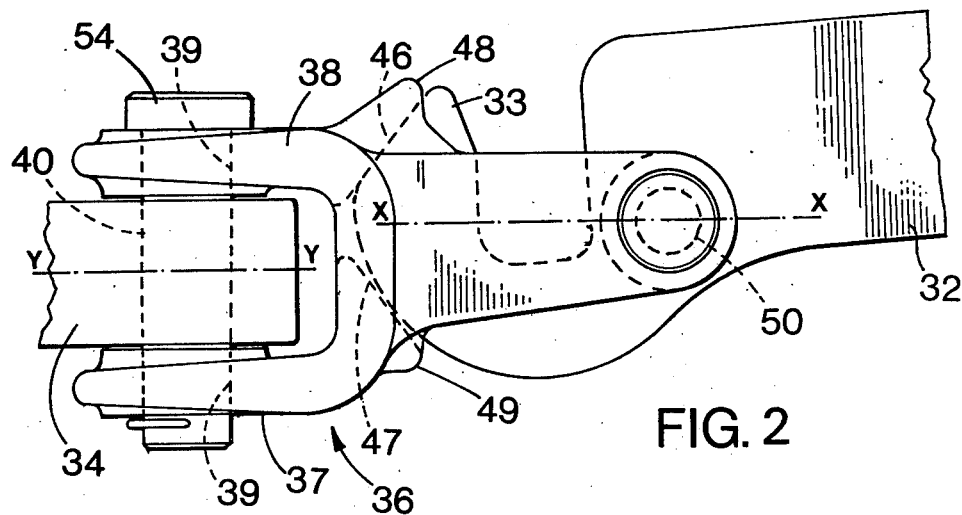
Figure 3:
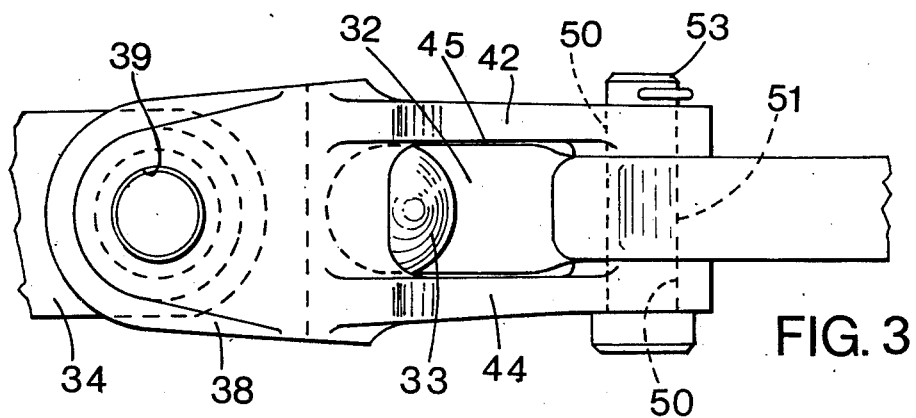
Figure 4:
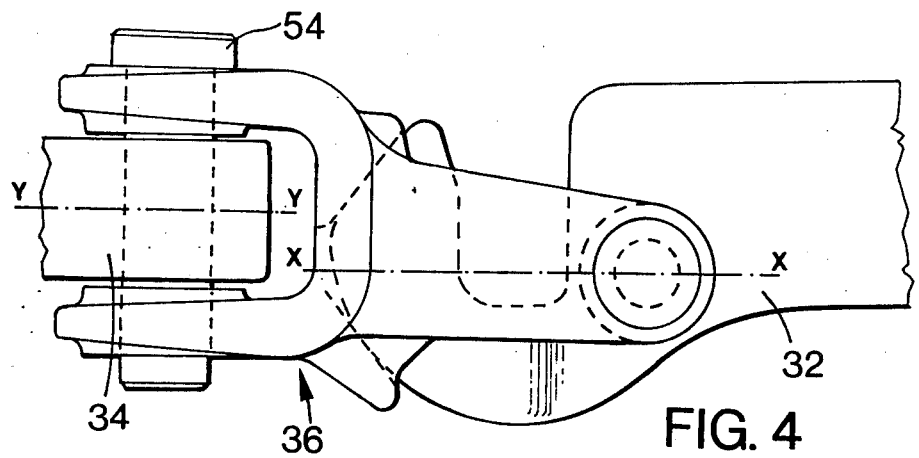
Figure 5A:
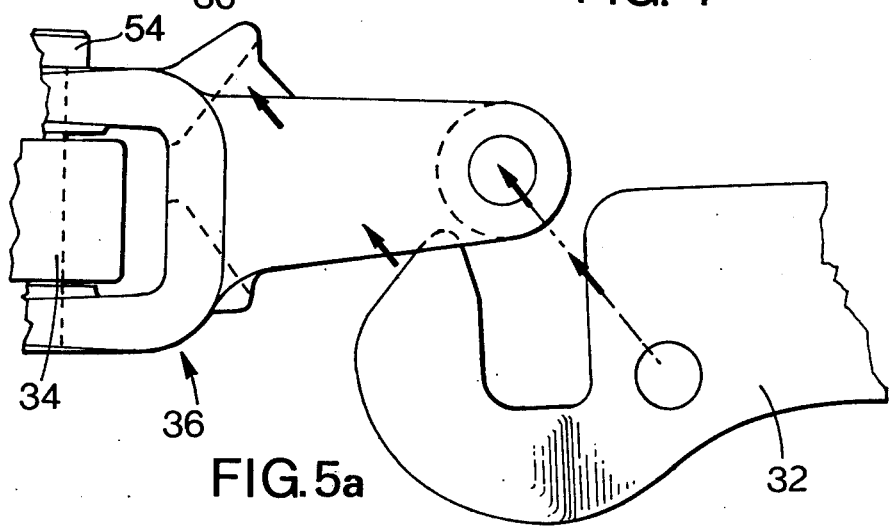
Figure 5B:
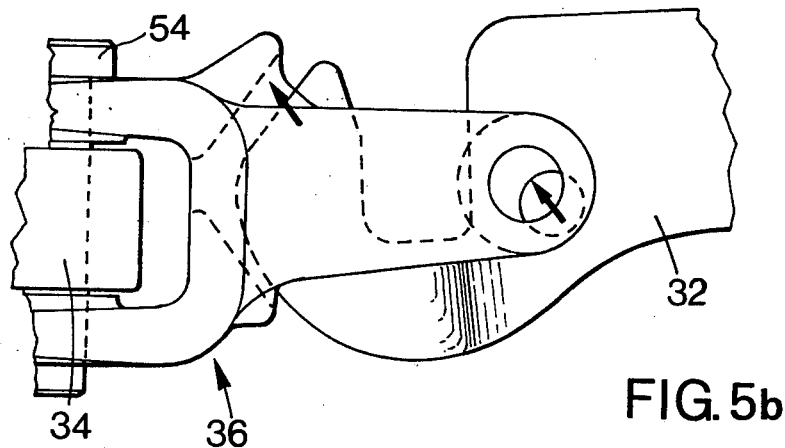

Further features of the invention will appear from the following description of an embodiment of the invention given by way of example only and with reference to the accompanying drawings, in which:

FIG. 1 is a side elevation of a tractor fitted with the assembly of the invention, FIG. 2 is a side elevation of the assembly, FIG. 3 is a plan view of the assembly of FIG. 2, FIG. 4 is a side elevation of the assembly of FIGS. 2 and 3 with the adaptor in an inverted position, and FIGS. 5a and 5b are side elevations showing how the adaptor is fitted to a draw bar hook.

Referring to the drawings and firstly to FIGS. 1, 2 and 3 a tractor 30 is of the kind having a draw bar hook 32 carried on the end of a draw bar rigidly attached to the tractor frame. The draw bar hook 32 is generally of conventional form having a hooked end of which the free end 33 tapers upwardly. To enable the hook 32 to be attached to the draw tongue 34 of a trailer or other towed vehicle (not shown) an adaptor 36 is interposed between the hook 32 and the tongue 34 to provide a rigid connection between the hook and tongue.

The adaptor 36 is formed with a clevis having two horizontal spaced arms 37 and 38 with aligned apertures 39 through which a pin 54 is inserted after aligning an aperture 40 in the tongue 34 with the apertures 39.

Integral arms 42 and 44 of the adaptor 36 extend generally horizontally in vertical planes to define an opening 45 between them for receiving the hook 32. The arms 42,44 are shaped to provide a wider opening near their junction than towards their free ends where the inside faces of the arms are closer together. At the junction of the arms 42,44 there are formed transverse surfaces 46 and 47 which are mutually inclined with respect to one another and are symmetrical about a centre line X—X passing through the arms. The surfaces 46 and 47 are inclined at such an angle as to engage the co-operating surfaces of the hook 32 as seen in FIG. 2. It will be seen that to provide for the surfaces 46 and 47 to be of sufficient length for their purpose projections 48 and 49 respectively are provided on the adaptor 36.

The free ends of the arms 42 are formed with horizontal aligned apertures 50 corresponding in size to an aperture 51 formed in the root of the hook 32 so that, when in the position shown in FIG. 2, an attachment pin 53 can be located through the aligned apertures 50 and 51 to attach the adaptor 36 to the hook 32. With the adaptor 36 in the position as shown in FIG. 2 and with the pin 53 in position it will be appreciated that the adaptor 36 is fixed relatively rigidly in position with respect to the hook 32, vertical movement being prevented by engagement of the surfaces 46, 47 of the adaptor with the hook and displacement in the horizontal direction being prevented by engagement of the hook with the sides of the arms 42.

Referring not to FIG. 4, it will be appreciated that since the surfaces 46 and 47 are symmetrical the adaptor 36 can be located on the hook 32 in an inverted position relative to that shown in FIG. 2 and this position is illustrated in FIG. 4. It will be seen that the centre line Y—Y of the tongue 34 lies at a higher level in the position of FIG. 4 than in the position of FIG. 2. Thus by inverting the adaptor 36 the location of the tongue 34 can be raised or lowered. This is due to the centre line of the clevis not being symmetrical with the centre line of the arms 42.

Reference is now made to FIGS. 5a and 5b to explain how the adaptor 36 is fitted to the hook 32. It will be appreciated that the widened part of the opening 45 is to accommodate the greater width of the hooked end of the hook 32 so that the hooked end has to be inserted into the opening 45 by relative oblique movement between the adaptor 36 and the hook 32 as indicated by the arrows in FIG. 5a until the surfaces 46 and 47 of the adaptor co-operate with the corresponding surfaces of the hook. It is then simple to align the apertures 50 and 51 so that the pin 53 can be inserted to attach the adaptor 36 to the hook 32. This final movement is obtained after the hook and adaptor have reached a position shown in FIG. 5b. It will be seen, therefore, that attachment of the adaptor to the hook is a simple operation and release of the adaptor is achieved just as easily after removing the pin 53.

I claim:

1. A hitch assembly for connecting together towing and towed vehicles comprising an adaptor having a clevis at one end for attachment to one vehicle having a draw tongue, an opening towards the other end, the opening being arranged to receive a hook mounted on another vehicle, and attachment means for attaching the end of the adaptor remote from the clevis releasably to the root of the hook, the opening having side walls profiled to inhibit movement of the adaptor about the attachment means and the adaptor lying in a generally horizontal plane between the draw tongue and the hook when in use.

2. An assembly according to claim 1 wherein the attachment means comprises a pin engageable through generally horizontal apertures in the adaptor and in the root of the hook.

3. An assembly according to claim 1 wherein said walls of the opening have mutually inclined portions located adjacent similarly disposed surfaces of the hook to inhibit movement of the adaptor about the hook in a vertical plane.

4. An assembly according to claim 1 wherein the opening is defined between two arms, the hook and its root lying between said arms.

5. An assembly according to claim 4 wherein at the free ends of the arms are formed apertures for receiving attachment means for attaching the adaptor to the hook.

6. An assembly according to claim 4 wherein the arms are shaped to be closer together towards their free ends than along the remainder of the arms to accommodate the hook.

7. An assembly according to claim 4 wherein the profiled side walls are located adjacent the junction of the two arms and extend transversely of the adaptor.

8. An assembly according to claim 1 wherein the adaptor is arranged to be attachable to the hook in two positions one of which is inverted relative to the other, and in one of said positions the tongue is at a lower level in relation to the hook than in the other position.

* * * * *